(12) United States Patent
Wang

(10) Patent No.: US 8,403,348 B1
(45) Date of Patent: Mar. 26, 2013

(54) VEHICLE RUNNING BOARD

(76) Inventor: Hsiang Ting Wang, Tainan (TW)

( * ) Notice: Subject to any disclaimer, the term of this patent is extended or adjusted under 35 U.S.C. 154(b) by 0 days.

(21) Appl. No.: 13/523,910

(22) Filed: Jun. 15, 2012

(51) Int. Cl.
*B60R 3/00* (2006.01)

(52) U.S. Cl. ............... 280/163; 280/165; 280/164.1; 280/169

(58) Field of Classification Search ........... 280/165, 280/166, 164.1, 163
See application file for complete search history.

(56) References Cited

U.S. PATENT DOCUMENTS 3,876,230 A * 4/1975 Phillips .................. 280/166
2007/0278760 A1 * 12/2007 VanBelle et al. ......... 280/166
2008/0246244 A1 * 10/2008 Watson ................... 280/166
2009/0181044 A1 * 7/2009 Apt et al. ................ 424/185.1

* cited by examiner

*Primary Examiner* — John Walters
*Assistant Examiner* — James Triggs

(57) ABSTRACT

A vehicle running board includes a treadle body having a bottom formed with an open slot. A guide plate is received in the open slot and positioned under positioning stop plates inside the open slot. Two sets of fixing members are respectively assembled at the lower side of the treadle body, and each fixing member is composed of a first clamping plate with two bolts, a second clamping plate bored with two insert holes, and two nuts, with the first and the second clamping plates clamping the guide plate. At least two connecting bases are respectively provided for assembling the treadle body at one side of a vehicle body, and each connecting base and each fixing member correspond with each other in setting position. Two protective covers are respectively mounted at two ends of the treadle body, and an anti-skid pad is stuck to the topside of the treadle body.

4 Claims, 7 Drawing Sheets

VEHICLE RUNNING BOARD

BACKGROUND OF THE INVENTION

1. Field of the Invention

This invention relates to a vehicle running board, particularly to one whose treadle body is able to be adjusted in setting position for matching with various styles of vehicles of different sizes, convenient in assembly and use, stable in whole structure and having great practicability.

2. Description of the Prior Art

Generally, a sport utility vehicle or a vehicle with a comparatively high chassis is additionally provided with a running board 10 at two sides of the vehicle body 1 for facilitating passengers to get on and off the vehicle. A conventional vehicle running board 10, referring to FIGS. 1 and 2, includes a tubular treadle body 11 having a bottom side bored with a plurality of threaded holes 110, a topside fixed with an anti-skid pad 12 and two sides respectively mounted with a protective cover 13. The treadle body 11 is secured on a connecting base 15 by bolts 14, and the connecting seat 15 to be firmly fixed at one side of the vehicle body 1 is bored with plural insert holes 150 at locations corresponding with the threaded holes 110 of the treadle body 11. When the conventional tubular treadle body 11 is to be assembled on the connecting seat 15, the threaded holes 110 at the bottom of the treadle body 11 must be respectively aligned to the insert holes 150 of the connecting base 15. However, since vehicles of various styles are not the same in size, and the positions for setting the connecting bases 15 are also different from each other; therefore, the locations of the threaded holes 110 of the treadle body 11 must be adjusted for matching stationary positions of the connecting bases 15 on different-styled vehicles. Unfortunately, the fixed connection structure of the conventional treadle body 11 cannot be adjusted for matching with the stationary setting position of the connecting seat 15 secured on the vehicle body 1. In this case, a vehicle factory has to reserve lots of running boards 10 and connecting bases 15 of different sizes and styles to be assembled on different-styled vehicles; therefore, the vehicle factory must have enough spaces for depositing such spare running boards 10 and the connecting bases 15, and as a result, the factory will be overstocked and the cost will be greatly accumulated.

SUMMARY OF THE INVENTION

This invention is devised to offer a vehicle running board able to be adjusted in assembly positions for matching various styles of vehicles of different sizes, convenient in assembly and use, having a stable structure and great practicability.

The vehicle running board in the present invention includes a treadle body formed with an open slot at a bottom and an accommodating chamber in an interior, and a plurality of positioning stop plates respectively having a threaded hole are arranged on the open slot of the treadle body. A guide plate to be assembled in the open slot of the treadle body is bored with plural insert holes at locations respectively corresponding with the threaded hole of each positioning stop plate, with a screw inserted through the insert hole of the guide plate and screwed in the threaded hole of the positioning stop plate. At least two sets of fixing members to be respectively positioned at the lower side of the treadle body are respectively composed of a first clamping plate, a second clamping plate and two nuts. The first clamping plate is provided thereon with two bolts and the second clamping plate is bored with two insert holes, the two bolts respectively inserted through the two insert holes. The first clamping plate and the second clamping plate clamp the guide plate, and the two nuts are respectively screwed on the two bolts of the first clamping plate. At least two connecting bases are provided for assembling the treadle body at two sides of a vehicle body. The connecting base and the fixing member correspond with each other in their setting positions. The connecting base is formed thereon with a first connecting plate positioned under the treadle body and bored with two long insert holes for the two bolts on the first clamping plate to be inserted therethrough. Two protective covers are respectively mounted at two ends of the treadle body, and an anti-skid pad is stuck on the topside of the treadle body.

The treadle body of the vehicle running board of this invention is made of a metal plate bent into shape, and the open slot of the treadle body has two end edges respectively bent inward reversely to form a bulgy edge.

The connecting base of the vehicle running board of this invention is further provided with a second connecting plate and a third connecting plate. The second connecting plate is bored with a second long insert hole and the third connecting plate bored with a third long insert hole for assembling the connecting base on a vehicle body.

The two protective covers of the vehicle running board of this invention are made of plastic and respectively have an inner side formed with an engage flange to be engaged in the accommodating chamber of the treadle body, and the engage flange has its lower side disposed with a notch.

The anti-skid pad of the vehicle running board of this invention is provided thereon with a plurality of strips of anti-skid raised patterns.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
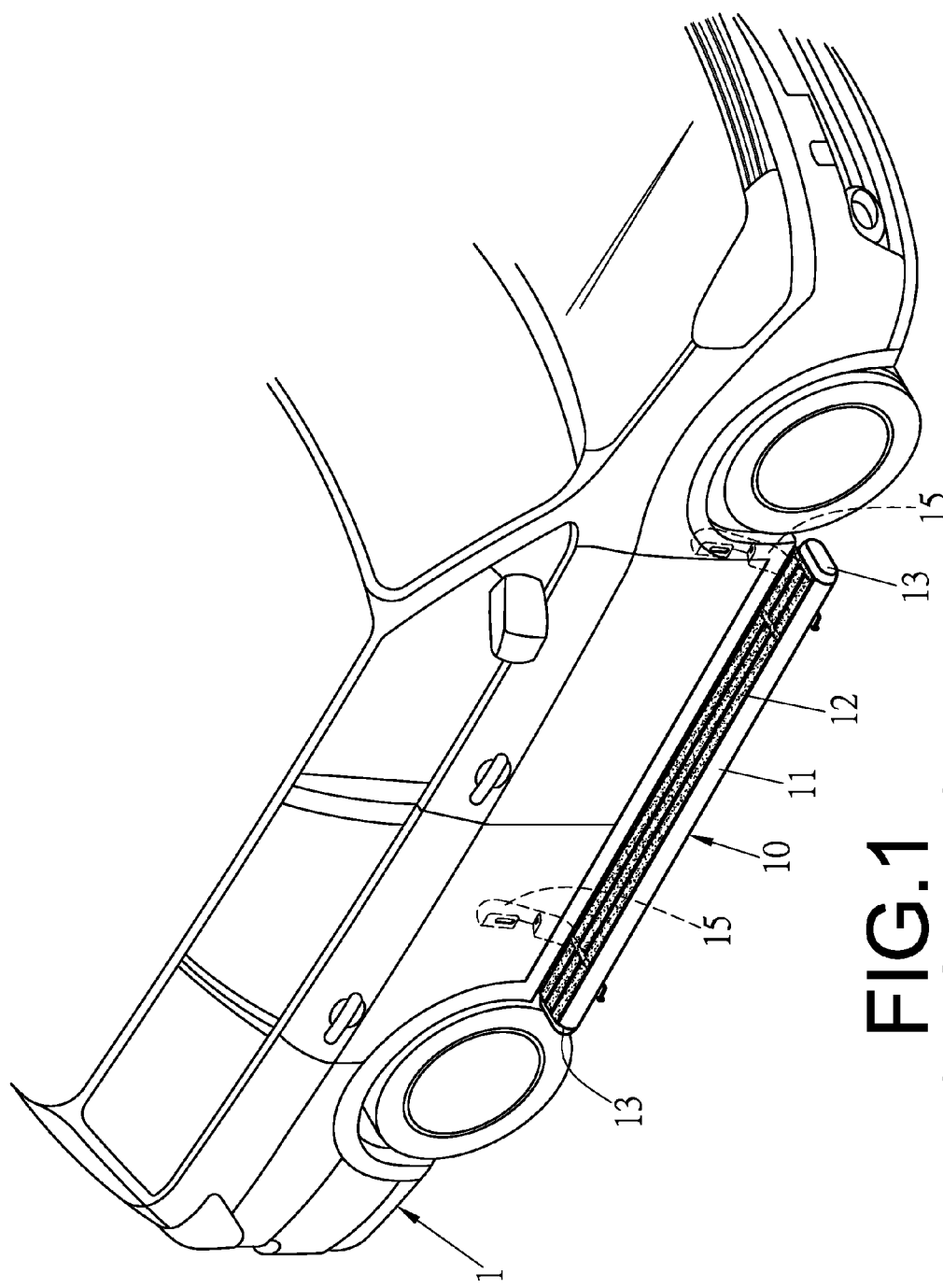
FIG. 1 is a schematic view of a conventional vehicle running board in a using condition.
Figure 2:
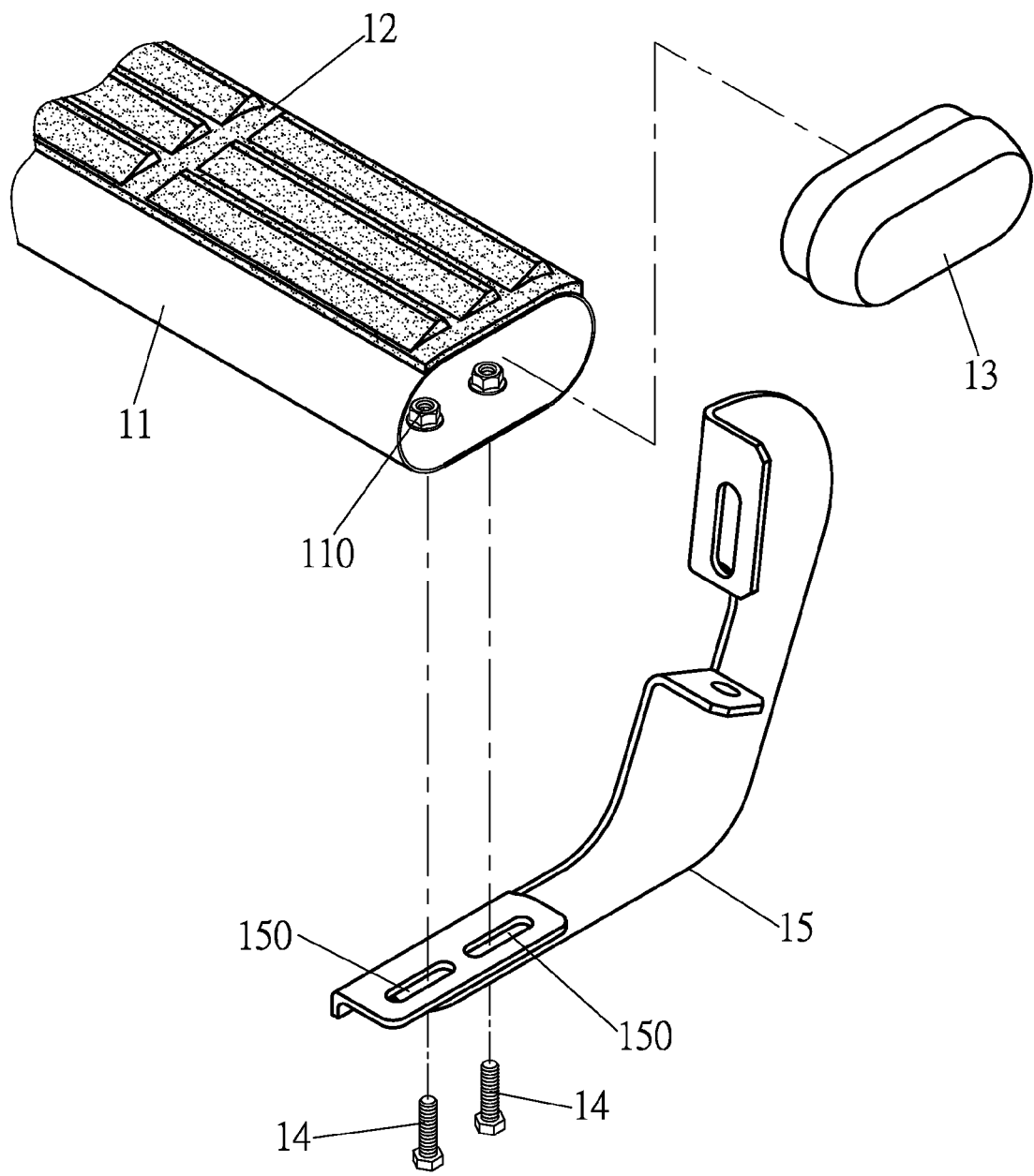
FIG. 2 is an exploded perspective view of the conventional vehicle running board.
Figure 3:
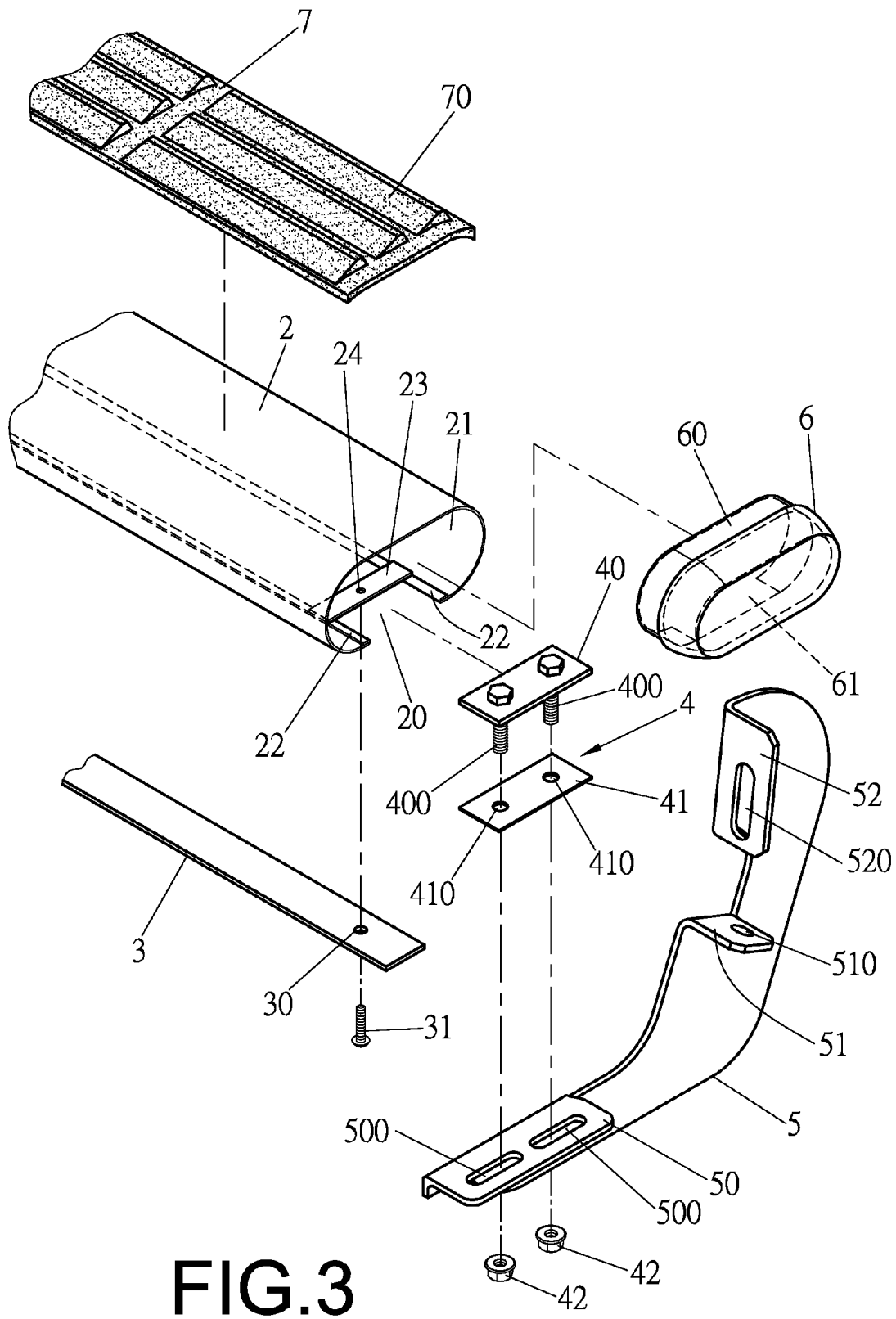
FIG. 3 is an exploded perspective view of a vehicle running board in the present invention.
Figure 4:
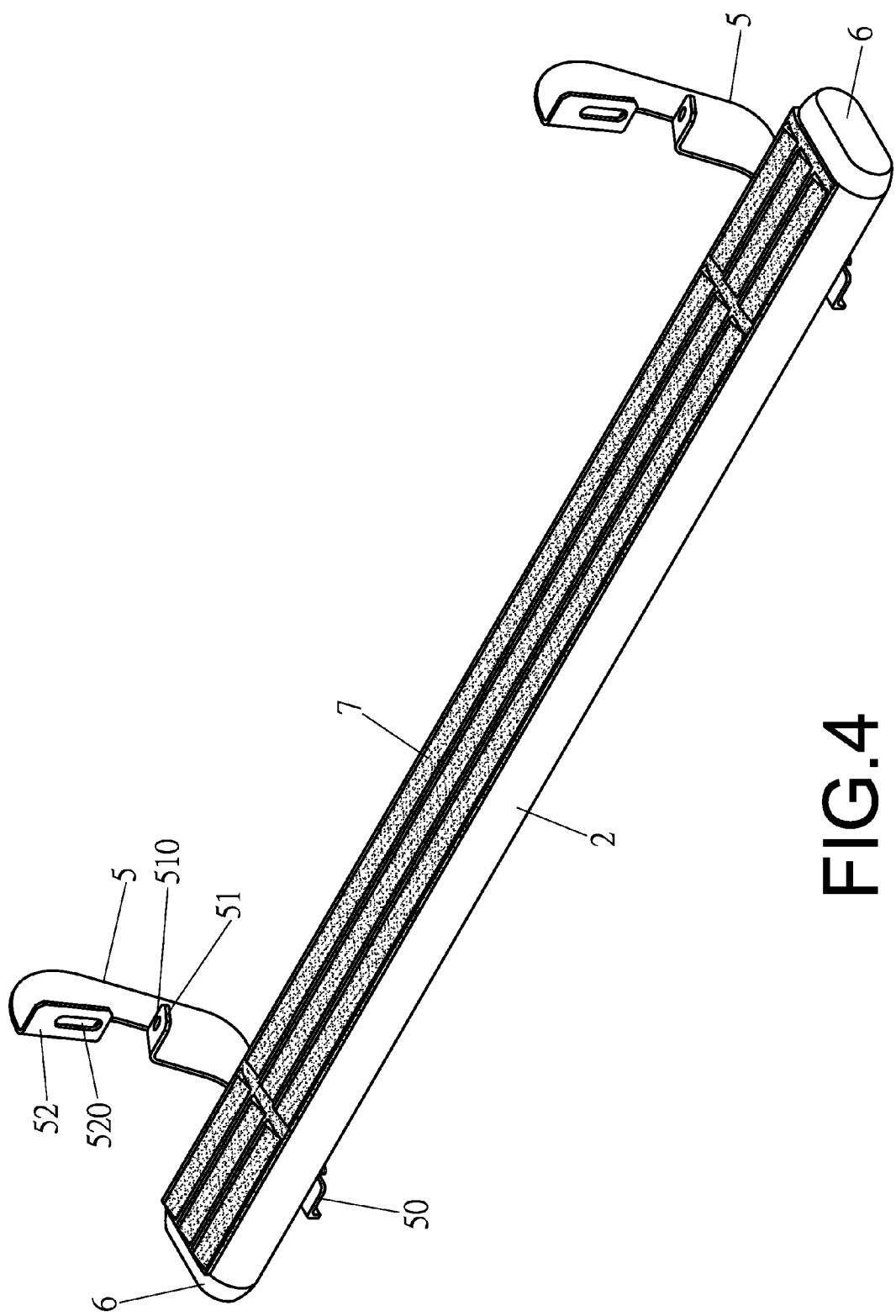
FIG. 4 is a perspective view of the vehicle running board in the present invention.
Figure 5:
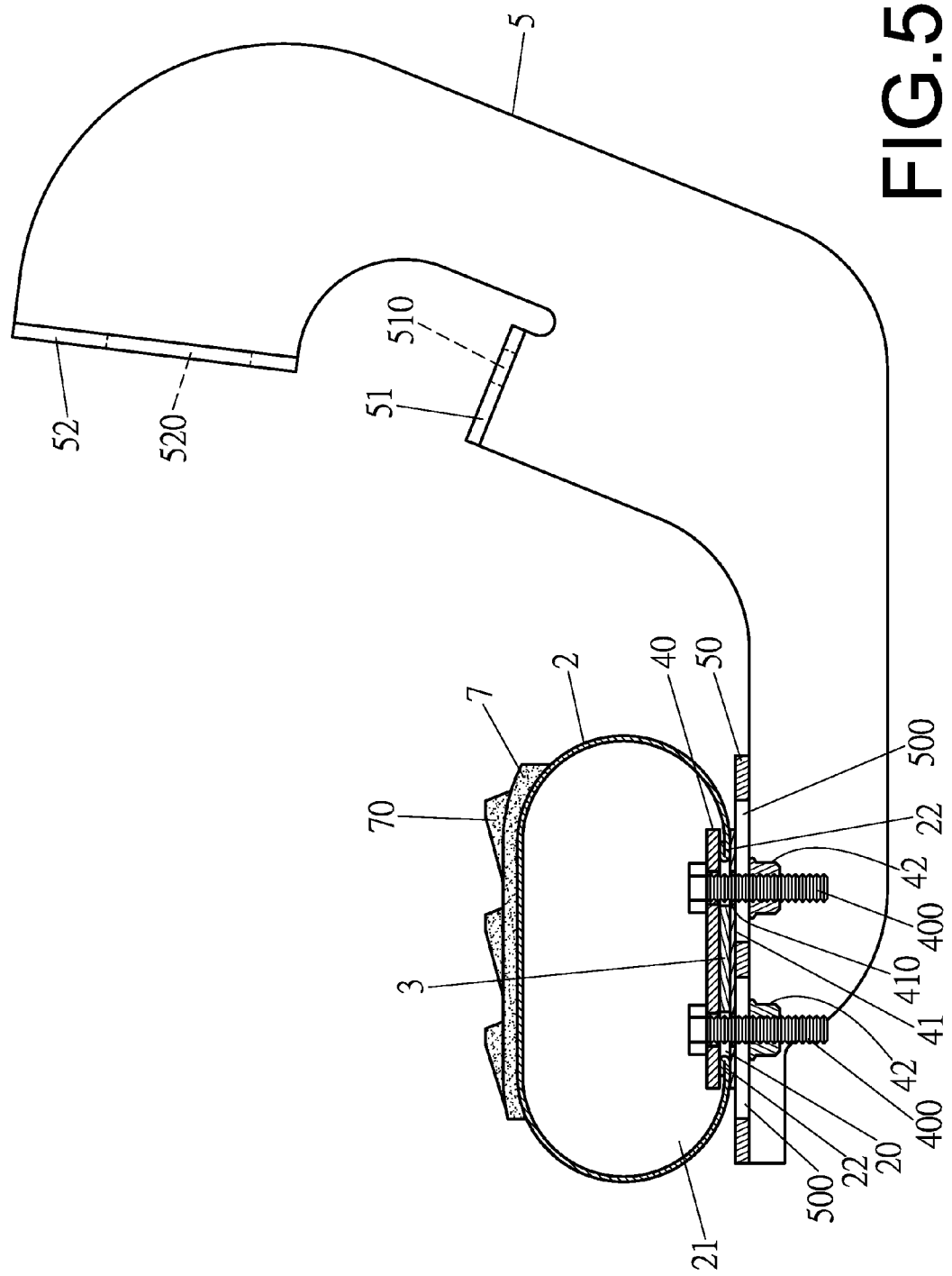
FIG. 5 is a side cross-sectional view of the vehicle running board assembled on a connecting base in the present invention.
Figure 6:
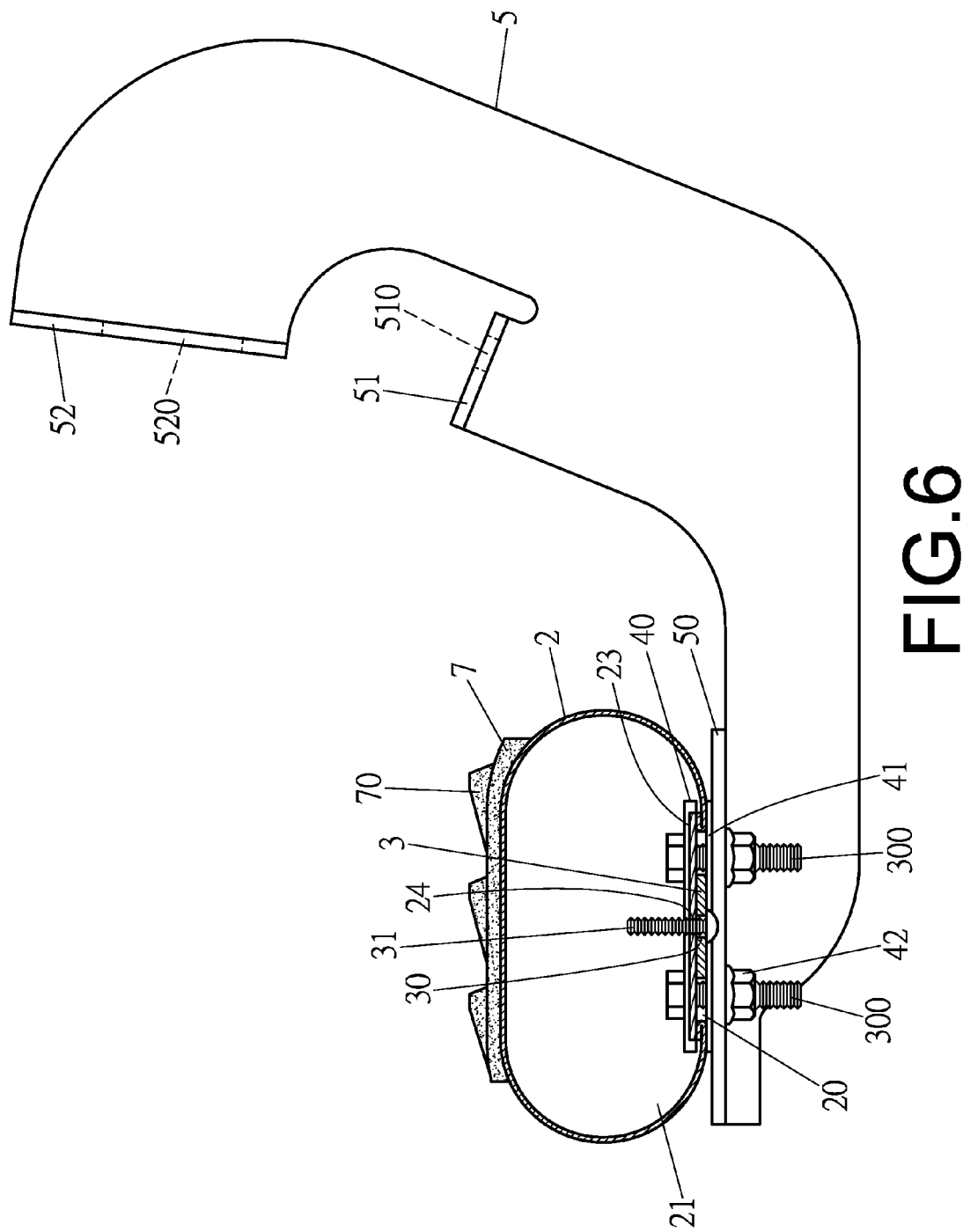
FIG. 6 is another side cross-sectional view of the vehicle running board assembled on the connecting seat in the present invention.
Figure 7:
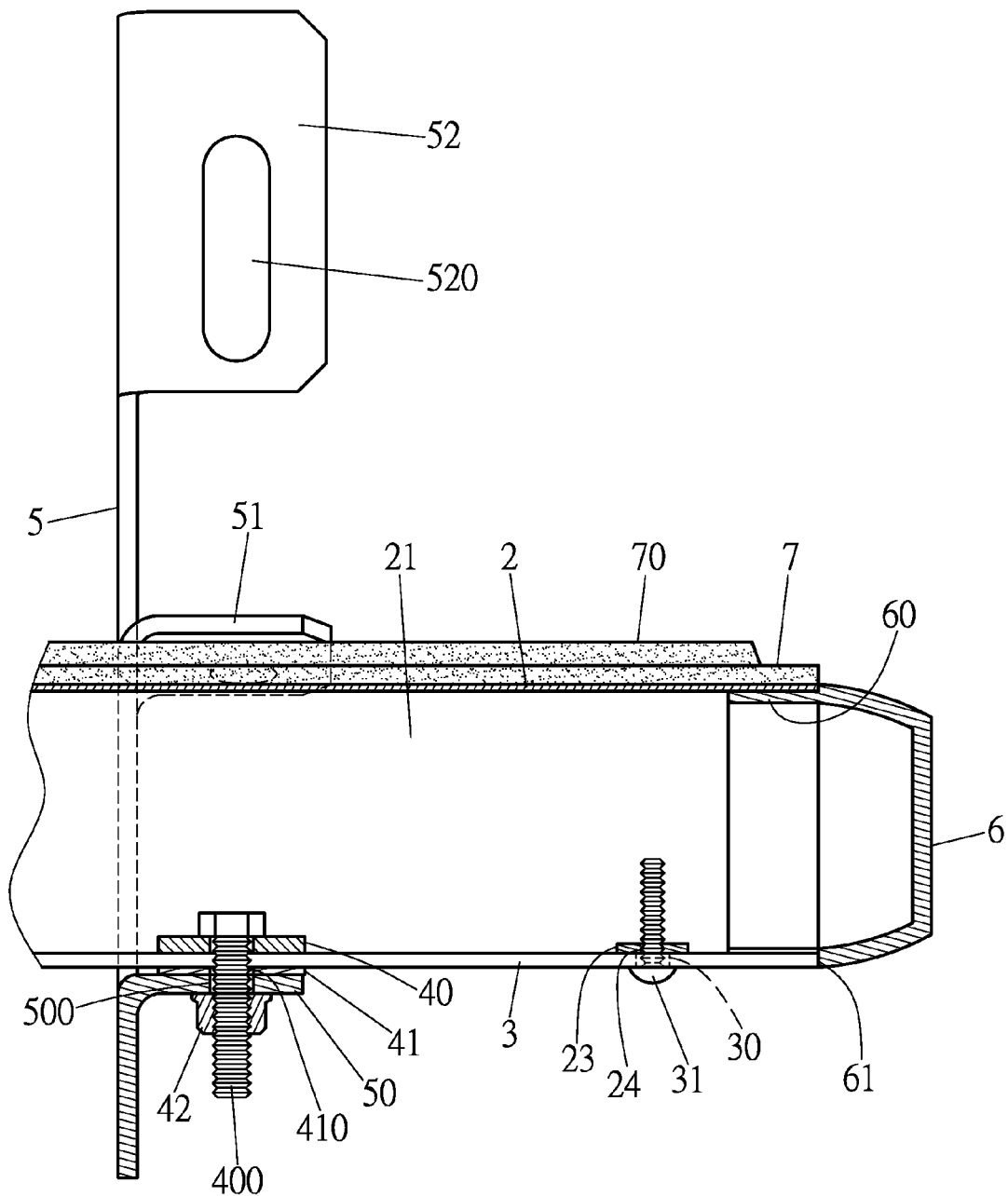
FIG. 7 is a cross-sectional view of the vehicle running board assembled on the connecting base in the present invention.

A preferred embodiment of a vehicle running board in the present invention, as shown in FIG. 3, includes a treadle body 2, a guide plate 3, at least two sets of fixing members 4, at least two connecting bases 5, two protective covers 6 and an anti-skid pad 7 as main components combined together.

The treadle body 2 made of a metal plate bent into shape is formed with an open slot 20 at the bottom and an accommodating chamber 21 in an interior. The open slot 20 of the treadle body 2 has two end edges respectively and reversely bent inward to form a bulgy edge 22, and a plurality of positioning stop plates 23 respectively having a threaded hole 24 are arranged on the open slot 20 of the treadle body 2.

The guide plate 3 received in the open slot 20 of the treadle body 2 and fixed under the positioning stop plates 23 is bored with insert hole 30 at location respectively corresponding with the threaded hole 24 of each positioning stop plate 23, with a screw 31 inserted through the insert hole 30 and threadably locked in the threaded hole 24 of the positioning stop plate 23.

The two sets of fixing members 4 to be respectively assembled at the lower side of the treadle body 2 are respectively composed of a first clamping plate 40, a second clamping plate 41 and two nuts 42. The first clamping plate 40 is provided thereon with two bolts 400 and the second clamping plate 41 is bored with two insert holes 410, with the two bolts 400 of the first clamping plate 40 respectively inserted through the insert holes 410 of the second clamping plate 41 and screwed with the nuts 42.

The at least two connecting bases 5 are respectively provided for assembling the treadle body 2 at one side of a vehicle body and corresponding with the two sets of fixing members 4 in setting position. Each connecting seat 5 is provided with a first connecting plate 50, a second connecting plate 51 and a third connecting plate 52, and the first connecting plate 50 is bored with two first long insert holes 500 for the two bolts 400 on the first clamping plate 40 of the fixing member 4 to be respectively inserted therethrough. The second connecting plate 51 is bored with a second long insert hole 510 and the third connecting plate 52 bored with a third long insert hole 520.

The two protective covers 6 made of plastic are respectively mounted at two opposite ends of the treadle body 2, respectively having an inner side provided with an engage flange 60 formed with a notch 61 at a lower side.

The anti-slid pad 7 to be stuck on the topside of the treadle body 2 is disposed thereon with plural strips of anti-skid raised patterns 70.

In assembling and using, referring to FIGS. 3-7, firstly, the at least two connecting bases 5 are respectively assembled at two sides of a vehicle (not shown) by means of the second connecting plate 51 and the third connecting plate 52 and fixing members and then, the treadle body 2 is cut into a suitable length according to the style of a vehicle on which the treadle body 2 is to be assembled, letting the length of the treadle body 2 able to match the length of a running board that is to be assembled on such a vehicle. Next, the guide plate 3 is set in the open slot 20 at the bottom of the treadle body 2 and secured therein by screws 31 inserted through the insert holes 30 of the guide plate 3 and then threadably fixed in the threaded holes 24 of the positioning stop plate 23 of the treadle body 2. Subsequently, each set of fixing member 4 is positioned at the lower side of the treadle body 2, letting the first clamping plate 40 received in the accommodating chamber 21 of the treadle body 2 and located on the guide plate 3 and the two bolts 400 of the first clamping plate 40 respectively positioned at two sides of the guide plate 3. Then, the second clamping plate 41 is assembled under the guide plate 3 to have the two bolts 400 of the first clamping plate 40 respectively inserted through the insert holes 410 of the second clamping plate 41, letting the first clamping plate 40 and the second clamping plate 41 clamp the guide plate 3. Further, the two bolts 400 have an intermediate small part compressed and flattened to firmly position the second clamping plate 4 on the two bolts 400 never to slip off and to form a gap between the second clamping plate 41 and the first clamping plate 40 for the guide plate 3 to be inserted therein. Afterward, the treadle body 2, the guide plate 3 and fixing members 4, which have been already assembled together, are installed on the first connecting plate 50 of the connecting base 5 of a vehicle body, letting the second clamping plate 41 of the fixing member 4 closely rest on the first connecting plate 50 and having the bolts 400 of the first clamping plate 40 further respectively inserted through the first long insert holes 500 of the first connecting plate 50 and then having the nuts 42 respectively screwed with the bolts 400 to stably assemble the treadle body 2 on the connecting base 5. Thus, the setting position of the treadle body 2 can be adjusted by having the fixing member 4 to slide and shift in the first long insert holes 500 of the first connecting plate 50, and hence the treadle body 2 can be stably secured at one side of a vehicle body. Lastly, the two protective covers 6 are respectively covered on the two ends of the treadle body 2, letting the engage flange 60 of the protective cover 6 engaged in the accommodating chamber 21 of the treadle body 2 and the protective covers 6 firmly positioned on two sides of the treadle body 2 and then, the anti-skid pad 7 is stuck to the topside of the treadle body 2 by means of adhesive agent, thus finishing assembly of the vehicle running board.

As can be understood from the above description, this invention has the following advantages.

1. The vehicle running board of this invention can be assembled quickly and conveniently.

2. After the fixing member 4 and all the attachments are finished assembling, the fixing member can be shifted in the open slot 20 of the treadle body 2 and can avoid slipping off during transporting and assembling.

3. The treadle body 2 of this invention can be cut into a suitable length for use for matching the style of a vehicle on which the treadle body 2 is to be assembled; therefore, it is only necessary to manufacture a single style of treadle body 2, which can be cut into a suitable length for matching the length of the running board used in various styles of vehicles.

4. The fixing member 4 having the first clamping plate 40 and the second clamping plate 41 clamping the guide plate 3 can conveniently be shifted along the guide plate 3 at the lower side of the treadle body 2 and adjusted for matching the setting position of the connecting base 5, convenient in assembly and use and stable in the whole structure.

While the preferred embodiment of the invention has been described above, it will be recognized and understood that various modifications may be made therein and the appended claims are intended to cover all such modifications that may fall within the spirit and scope of the invention.

What is claimed is:

1. A vehicle running board comprising:
a treadle body formed with an open slot at a bottom and an accommodating chamber in an interior, a plurality of positioning stop plates arranged on said open slot of said treadle body, each said positioning stop plate bored with a threaded hole;
a guide plate positioned in said open slot of said treadle body, said guide plate bored with plural insert holes at locations respectively corresponding with said threaded hole of said positioning stop plate, a screw inserted through each said insert hole of said guide plate and screwed in said threaded hole of said positioning stop plate;
at least two sets of fixing members respectively assembled at a lower side of said treadle body, each said fixing member composed of a first clamping plate, a second clamping plate and two nuts, said first clamping plate disposed thereon with two bolts, said second clamping plate bored with two insert holes, said two bolts of said first clamping plate inserted through said insert holes of said second clamping plate, said first clamping plate and said second clamping plate clamping said guide plate, said two nuts respectively threadably secured on said two bolts of said first clamping plate;

at least two connecting basses respectively provided for assembling said treadle body at one side of a vehicle body, each said connecting base and each said fixing member corresponding with each other in their setting positions, each said connecting base provided with a first connecting plate, said first connecting plate positioned under said treadle body, said first connecting plate bored with two first long insert holes, said two first long insert holes provided for said two bolts of said first clamping plate of said fixing member to be respectively inserted there through; and two protective covers respectively mounted at two ends of said treadle body.

2. The vehicle running board as claimed in claim 1, wherein said treadle body is made of a metal plate bent into shape, said open slot of said treadle body having two end edges respectively and reversely bent inward to form a bulgy edge.

3. The vehicle running board as claimed in claim 1, wherein said connecting base is further disposed with thereon with a second connecting plate and a third connecting plate, said second connecting plate bored with a second long insert hole and said third connecting plate bored with a third long insert hole for assembling said connecting base on a vehicle body.

4. The vehicle running board as claimed in claim 1, wherein said protective cover is made of plastic and provided with an engage flange to be engaged in said accommodating chamber of said treadle body.

* * * * *